US012591783B2

(12) United States Patent
Hong et al.

(10) Patent No.: US 12,591,783 B2
(45) Date of Patent: Mar. 31, 2026

(54) METHOD AND APPARATUS FOR CONSTRUCTING RECOMMENDATION MODEL AND NEURAL NETWORK MODEL, ELECTRONIC DEVICE, AND STORAGE MEDIUM

(71) Applicant: Tencent Technology (Shenzhen) Company Limited, Shenzhen (CN)

(72) Inventors: Litao Hong, Shenzhen (CN); Yongyao Chao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 688 days.

(21) Appl. No.: 18/072,622

(22) Filed: Nov. 30, 2022

(65) Prior Publication Data

US 2023/0094293 A1 Mar. 30, 2023

Related U.S. Application Data

(63) Continuation of application No. PCT/CN2021/112762, filed on Aug. 16, 2021.

(30) Foreign Application Priority Data

Sep. 4, 2020 (CN) .......................... 202010919935.5

(51) Int. Cl.
*G06N 3/091* (2023.01)

(52) U.S. Cl.
CPC .................................... *G06N 3/091* (2023.01)

(58) Field of Classification Search
CPC ...................................................... G06N 3/091
See application file for complete search history.

(56) References Cited

U.S. PATENT DOCUMENTS

| | | | |
|---|---|---|---|
| 10,554,817 B1 * | 2/2020 | Sullivan | .............. H04M 7/0036 |
| 12,181,847 B1 * | 12/2024 | Brett | ...................... G06N 20/00 |

(Continued)

FOREIGN PATENT DOCUMENTS

| | | |
|---|---|---|
| CN | 109241031 A | 1/2019 |
| CN | 109241418 A | 1/2019 |

(Continued)

OTHER PUBLICATIONS

Tencent Technology, WO, PCT/CN2021/112762, Nov. 17, 2021, 4 pgs.

(Continued)

*Primary Examiner* — Tarek Chbouki

(74) *Attorney, Agent, or Firm* — Morgan, Lewis & Bockius LLP

(57) ABSTRACT

This application provides a method and apparatus for constructing a recommendation model. In some examples, a plurality of feature tables corresponding to each application scenario in a recommendation project are aggregated to obtain an aggregated feature table. The recommendation project may include a plurality of application scenarios in a one-to-one correspondence with a plurality of recommendation indicators of a to-be-recommended item. Each application scenario can have a recommendation model to predict a corresponding recommendation indicator. Corresponding user feature and item feature may be received from the aggregated feature table based on a user identifier and an item identifier included in a sample data table. The features can be stitched with the sample data table to form a training sample set. The recommendation model of the application scenario may be trained based on the training sample set.

18 Claims, 6 Drawing Sheets

(56) References Cited

U.S. PATENT DOCUMENTS

| | | | |
|---|---|---|---|
| 2016/0371589 A1 | 12/2016 | Golbandi et al. | |
| 2018/0247362 A1 | 8/2018 | Guo et al. | |
| 2019/0108471 A1* | 4/2019 | Widanapathirana | ........................ G06Q 10/063114 |
| 2020/0311600 A1* | 10/2020 | Kulkarni | ................... G06F 8/71 |
| 2021/0374600 A1* | 12/2021 | Wisniewski | .......... G06F 16/254 |

FOREIGN PATENT DOCUMENTS

| | | | | |
|---|---|---|---|---|
| CN | 109978177 A | * | 7/2019 | |
| CN | 111026971 A | | 4/2020 | |
| CN | 111582596 A | | 8/2020 | |
| WO | WO-2019037260 A1 | * | 2/2019 | ......... G06Q 30/0242 |

OTHER PUBLICATIONS

Tencent Technology, IPRP, PCT/CN2021/112762, Mar. 7, 2023, 5 pgs.

Tencent Technology, ISR, PCT/CN2021/112762, Nov. 17, 2021, 2 pgs.

* cited by examiner

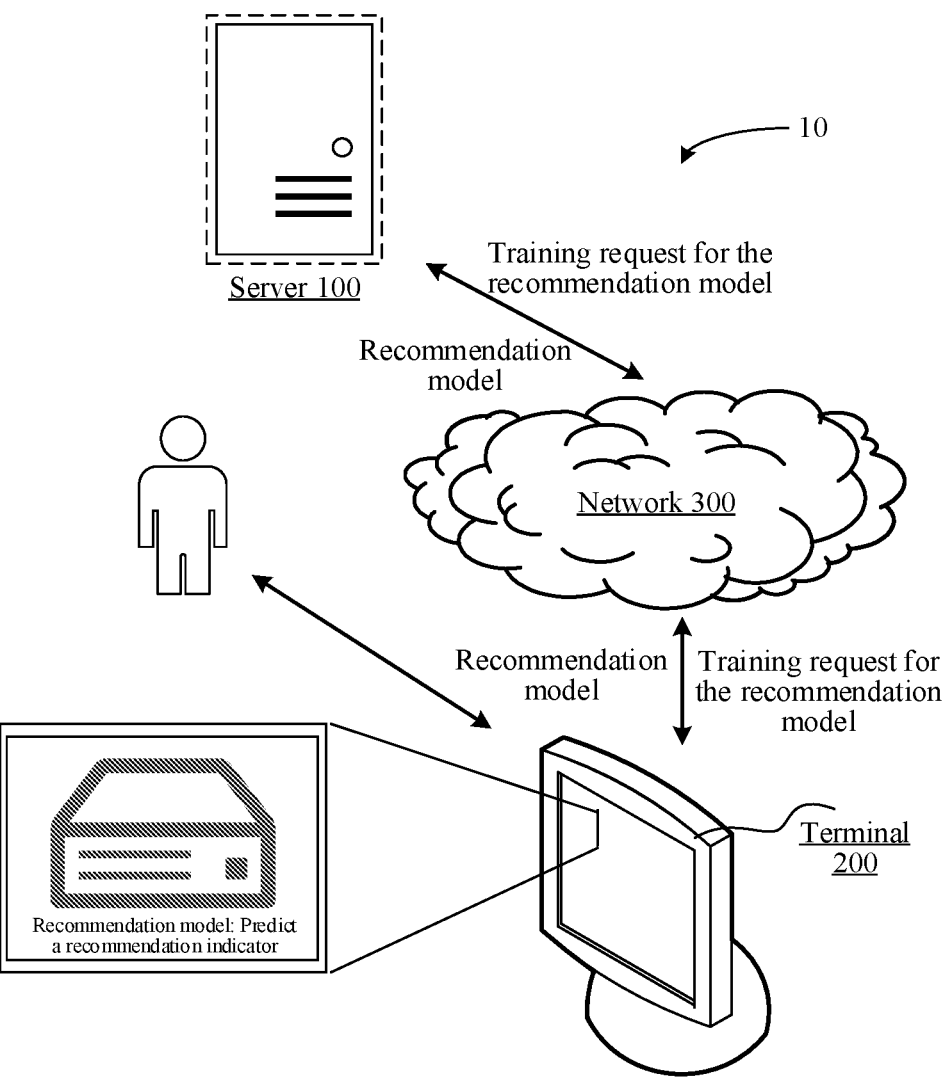

Server 100

Training request for the recommendation model

Recommendation model

Network 300

Recommendation model

Training request for the recommendation model

Terminal 200

Recommendation model: Predict a recommendation indicator

FIG. 1

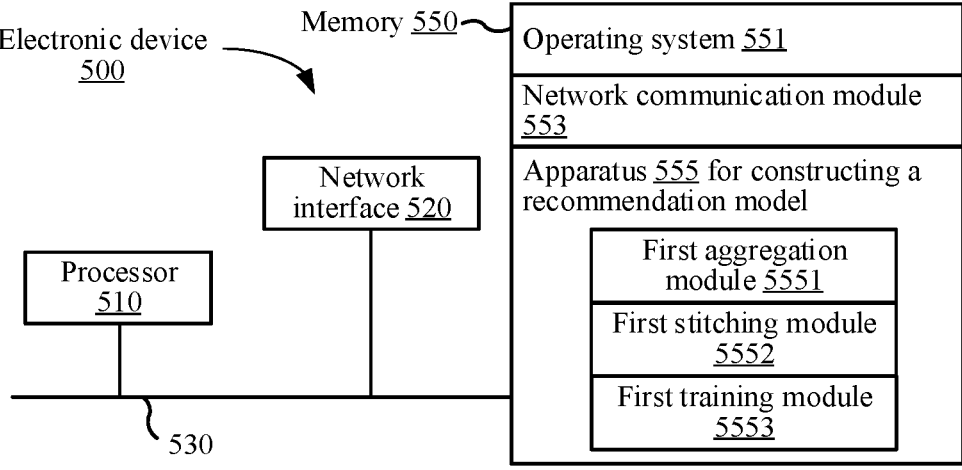

Electronic device 500

Memory 550

Operating system 551

Network communication module 553

Apparatus 555 for constructing a recommendation model

Network interface 520

Processor 510

First aggregation module 5551

First stitching module 5552

First training module 5553

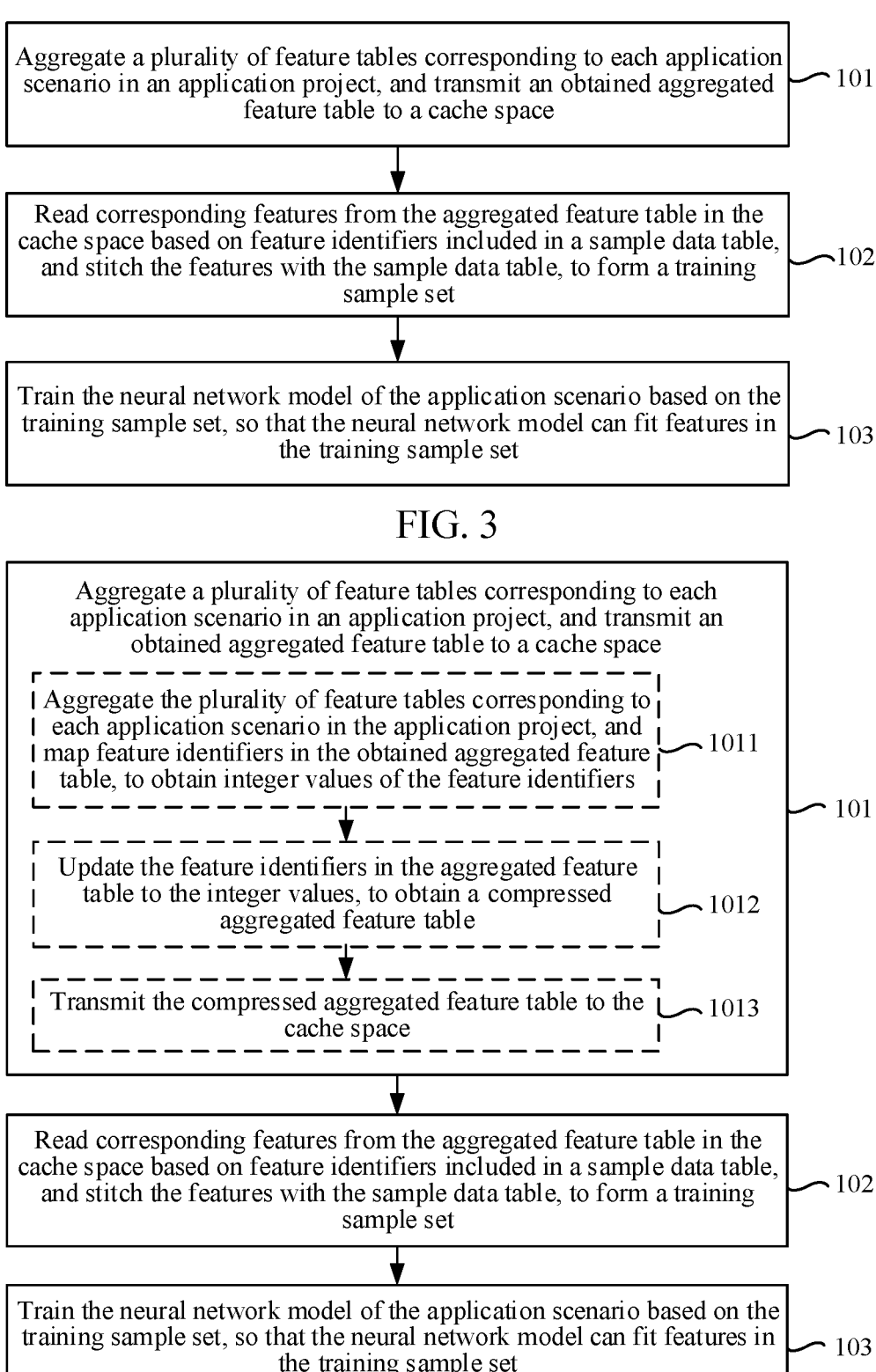

Aggregate a plurality of feature tables corresponding to each application scenario in an application project, and transmit an obtained aggregated feature table to a cache space ⟋‾101

Read corresponding features from the aggregated feature table in the cache space based on feature identifiers included in a sample data table, and stitch the features with the sample data table, to form a training sample set ⟋‾102

Train the neural network model of the application scenario based on the training sample set, so that the neural network model can fit features in the training sample set ⟋‾103

FIG. 3

Aggregate a plurality of feature tables corresponding to each application scenario in an application project, and transmit an obtained aggregated feature table to a cache space Aggregate the plurality of feature tables corresponding to each application scenario in the application project, and map feature identifiers in the obtained aggregated feature table, to obtain integer values of the feature identifiers ⟋‾1011

Update the feature identifiers in the aggregated feature table to the integer values, to obtain a compressed aggregated feature table ⟋‾1012

Transmit the compressed aggregated feature table to the cache space ⟋‾1013

⟋‾101

Read corresponding features from the aggregated feature table in the cache space based on feature identifiers included in a sample data table, and stitch the features with the sample data table, to form a training sample set ⟋‾102

Train the neural network model of the application scenario based on the training sample set, so that the neural network model can fit features in the training sample set ⟋‾103

FIG. 4

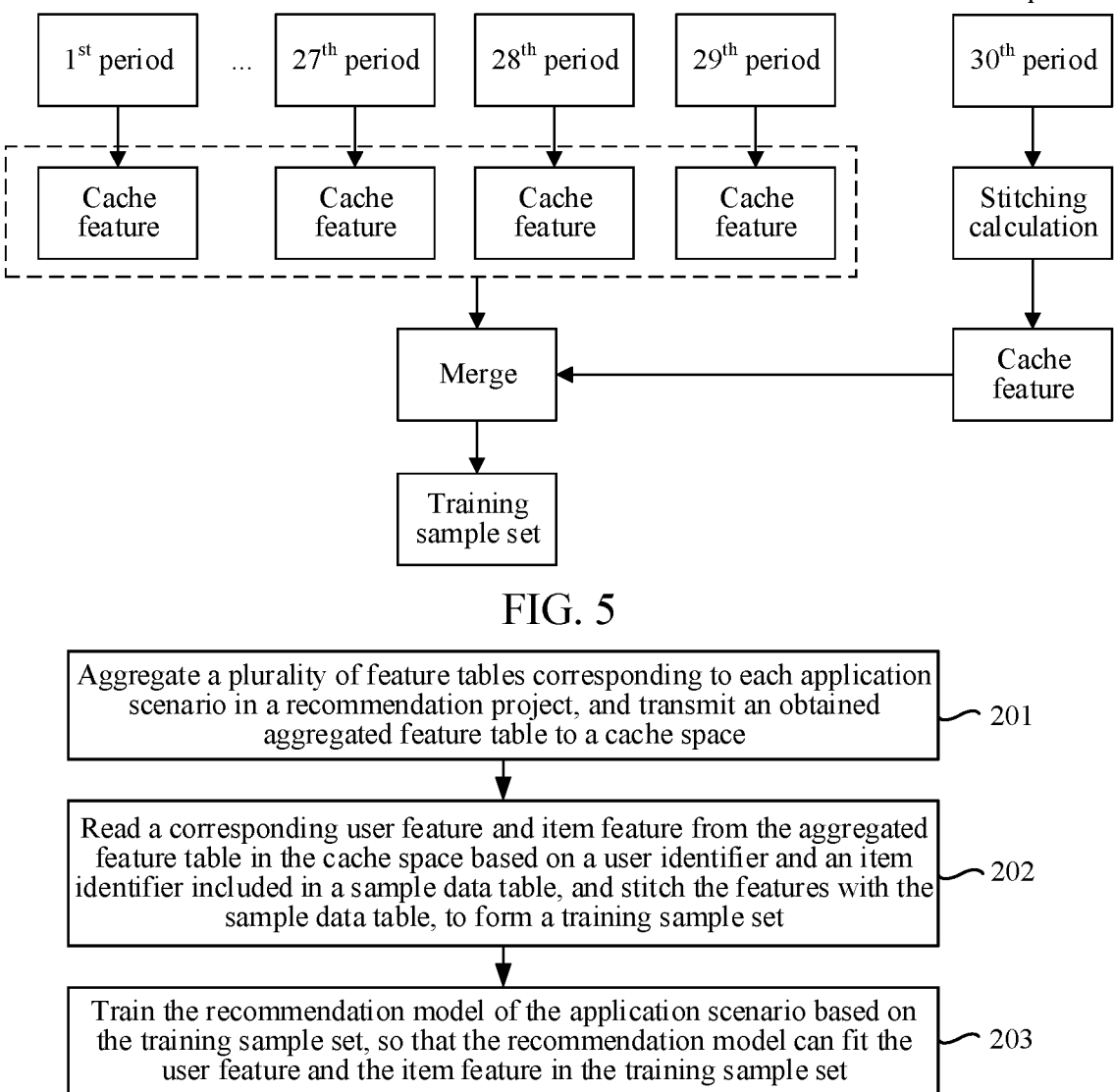

FIG. 5

Aggregate a plurality of feature tables corresponding to each application scenario in a recommendation project, and transmit an obtained aggregated feature table to a cache space ⌐ 201

Read a corresponding user feature and item feature from the aggregated feature table in the cache space based on a user identifier and an item identifier included in a sample data table, and stitch the features with the sample data table, to form a training sample set ⌐ 202

Train the recommendation model of the application scenario based on the training sample set, so that the recommendation model can fit the user feature and the item feature in the training sample set ⌐ 203

FIG. 6

METHOD AND APPARATUS FOR CONSTRUCTING RECOMMENDATION MODEL AND NEURAL NETWORK MODEL, ELECTRONIC DEVICE, AND STORAGE MEDIUM

CROSS-REFERENCE TO RELATED APPLICATIONS

This application is a continuation application of PCT Patent Application No. PCT/CN2021/112762, entitled "METHOD AND APPARATUS FOR CONSTRUCTING RECOMMENDATION MODEL, METHOD AND APPARATUS FOR CONSTRUCTING NEURAL NETWORK MODEL, AND ELECTRONIC DEVICE AND STORAGE MEDIUM" filed on Aug. 16, 2021, which claims priority to Chinese Patent Application No. 202010919935.5, filed with the State Intellectual Property Office of the People's Republic of China on Sep. 4, 2020, and entitled "METHOD AND DEVICE FOR CONSTRUCTING RECOMMENDATION MODEL, ELECTRONIC EQUIPMENT AND STORAGE MEDIUM", all of which are incorporated herein by reference in their entirety.

FIELD OF THE TECHNOLOGY

This application relates to artificial intelligence technologies, and in particular, to a method and apparatus for constructing a recommendation model and a neural network model, an electronic device, and a computer-readable storage medium.

BACKGROUND OF THE DISCLOSURE

Artificial Intelligence (AI) is a comprehensive technology of computer science, which studies design principles and implementation methods of various intelligent machines, so that the machines have the functions of perception, reasoning, and decision-making. The artificial intelligence technology is a comprehensive discipline and relates to a wide range of fields, for example, a natural language processing technology and machine learning/deep learning. With the development of technologies, the artificial intelligence technology will be applied in more fields and play an increasingly important role.

In the related art, a neural network model, for example, a recommendation model is constructed based on artificial intelligence, so that users can discover information in which the users may be interested through the recommendation model in an environment of a problem of information overload, and the information is pushed to users having interest.

However, in the related art, constructing the recommendation model consumes a large amount of computer resources, resulting in relatively low efficiency of constructing the recommendation model.

SUMMARY

Embodiments of this application provide a method and apparatus for constructing a recommendation model and a neural network model, an electronic device, and a computer-readable storage medium, which can pre-aggregate a plurality of feature tables corresponding to application scenarios, thereby improving efficiency of constructing the recommendation model.

The technical solutions in the embodiments of this application are implemented as follows.

An embodiment of this application provides a method for constructing a recommendation model performed by an electronic device, including:

aggregating a plurality of feature tables corresponding to each application scenario in a recommendation project to obtain an aggregated feature table, and transmitting the obtained aggregated feature table to a cache space, the recommendation project including a plurality of application scenarios in a one-to-one correspondence with a plurality of recommendation indicators of a to-be-recommended item, each application scenario having a recommendation model being configured to predict a corresponding recommendation indicator;

receiving a corresponding user feature and item feature from the aggregated feature table in the cache space based on a user identifier and an item identifier included in a sample data table, and stitching the features with the sample data table, to form a training sample set; and training the recommendation model of the application scenario based on the training sample set, the trained recommendation model being capable of fitting a user feature and an item feature in the training sample set.

An embodiment of this application provides a method for constructing a neural network model, including, aggregating a plurality of feature tables corresponding to each application scenario in a recommendation project to obtain an aggregated feature table, and transmitting the obtained aggregated feature table to a cache space, the application project including a plurality of application scenarios in a one-to-one correspondence with a plurality of application indicators, a neural network model of each application scenario being configured to predict a corresponding application indicator;

reading corresponding features from the aggregated feature table in the cache space based on feature identifiers included in a sample data table, and stitching the features with the sample data table, to form a training sample set; and training the neural network model of the application scenario based on the training sample set, the trained neural network model being capable of fitting features in the training sample set.

An embodiment of this application provides an apparatus for constructing a recommendation model, including:

a first aggregation module, configured to aggregate a plurality of feature tables corresponding to each application scenario in a recommendation project to obtain an aggregated feature table, and transmitting the obtained aggregated feature table to a cache space, the recommendation project including a plurality of application scenarios in a one-to-one correspondence with a plurality of recommendation indicators of a to-be-recommended item, a recommendation model of each application scenario being configured to predict a corresponding recommendation indicator;

a first stitching module, configured to read a corresponding user feature and item feature from the aggregated feature table in the cache space based on a user identifier and an item identifier included in a sample data table, and stitch the features with the sample data table, to form a training sample set; and a first training module, configured to train the recommendation model of the application scenario based on the training sample set, the trained recommendation model being capable of fitting a user feature and an item feature in the training sample set.

An embodiment of this application provides an apparatus for constructing a neural network model, including:

a second aggregation module, configured to aggregate a plurality of feature tables corresponding to each application scenario in an application project, and transmit an obtained aggregated feature table to a cache space, the application project including a plurality of application scenarios in a one-to-one correspondence with a plurality of application indicators, a neural network model of each application scenario being configured to predict a corresponding application indicator;

a second stitching module, configured to read corresponding features from the aggregated feature table in the cache space based on feature identifiers included in a sample data table, and stitch the features with the sample data table, to form a training sample set; and a second training module, configured to train the neural network model of the application scenario based on the training sample set, the trained neural network model being capable of fitting features in the training sample set.

An embodiment of this application provides an electronic device for recommendation model construction, including:

a memory, configured to store executable instructions; and a processor, configured to implement, when executing the executable instructions stored in the memory, the method for constructing a recommendation model provided in this embodiment of this application.

An embodiment of this application provides an electronic device for neural network model construction, including:

a memory, configured to store executable instructions; and a processor, configured to implement, when executing the executable instructions stored in the memory, the method for constructing a neural network model provided in this embodiment of this application.

An embodiment of this application provides a non-transitory computer-readable storage medium, storing executable instructions, the executable instructions, when executed by a processor of an electronic device, causing the electronic device to implement the method for constructing a recommendation model provided in this embodiment of this application.

An embodiment of this application provides a non-transitory computer-readable storage medium, storing executable instructions, the executable instructions, when executed by a processor of an electronic device, causing the electronic device to implement the method for constructing a neural network model provided in this embodiment of this application.

The embodiments of this application have the following beneficial effects:

A plurality of feature tables corresponding to each application scenario are aggregated, and an obtained aggregated feature table is transmitted to a cache space, so that a neural network model of the application scenario can be trained by multiplexing the aggregated feature table, thereby reducing waste of computer resources and improving the efficiency of constructing the neural network model.

BRIEF DESCRIPTION OF THE DRAWINGS

FIG. 1 is a schematic diagram of an application scenario of a recommendation system according to an embodiment of this application.

FIG. 2 is a schematic structural diagram of an electronic device for recommendation model construction according to an embodiment of this application.

FIG. 3 and FIG. 4 are schematic flowcharts of a method for constructing a neural network model according to an embodiment of this application.

FIG. 5 is a schematic flowchart of stitching cache features according to an embodiment of this application.

FIG. 6 is a schematic flowchart of a method for constructing a recommendation model according to an embodiment of this application.

DESCRIPTION OF EMBODIMENTS

Figures 7, 8:
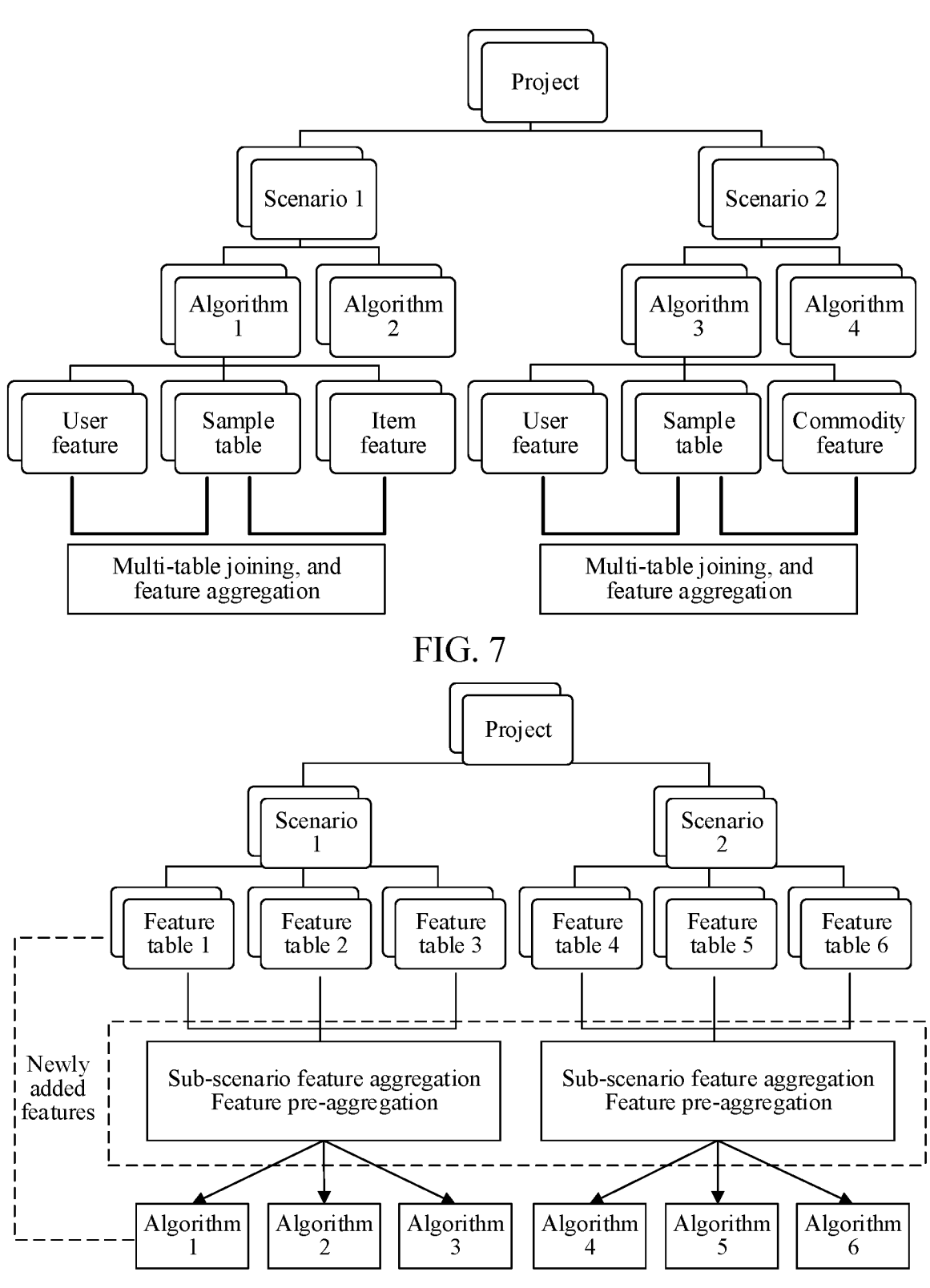
FIG. 7 is a schematic flowchart of stitching offline features according to an embodiment of this application.
FIG. 8 is a schematic flowchart of first-level cache according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

Before the embodiments of this application are further described in detail, nouns and terms involved in the embodiments of this application are described. The nouns and terms provided in the embodiments of this application are applicable to the following explanations.

1) Feature stitching: Preparation preset before machine learning modeling includes original feature and sample preparation, where features are distributed in a plurality of storage locations and are not associated with samples, and as a result, an algorithm training input cannot directly be performed, and the samples needs to be stitched with the features before model training.

2) Storage compression: Feature keys (feature identifiers) in a service scenario are usually stored in the form of characters. To better understand features, a character string is relatively long. Since the amount of features used in most modeling scenario is very large, high storage overheads may be caused when the feature keys are all stored in the form of characters during stitching.

The feature keys are integrally mapped by using a specific hash algorithm to generate integer values occupying less storage space.

3) Feature index hash: After features (from a feature table) and samples (from a sample data table) are stitched, feature keys need to be encoded to generate a corresponding index, and the index is directly inputted into a model for training. To improve the performance of feature index generation, a hash value with time complexity of O(1) is generated through hashing, thereby greatly improving the performance.

4) Multi-period cache: Stitching between samples and multi-period features is often required for algorithmic training. To enrich a sample amount to achieve a better modeling effect, during multi-period stitching, cache optimization needs to be performed when the performance is very low in each full stitching, and therefore, historical stitched periodic data may be cached for subsequent incremental stitching.

5) Sample: The sample mentioned in this embodiment of this application represents original identifier data, for example, the sample includes identifier data such as a user identifier, an item identifier, a label, a weight, and the like. Correspondingly, the feature mentioned in this embodiment of this application represents entity data associated with the sample, for example, the feature includes a feature of a user portrait, an item click feature, a text statistical feature, and the like.

6) Data cleaning: Specific processing is performed on original data provided, to facilitate subsequent feature extraction. Data cleaning includes data stitching. Since provided data is scattered in a plurality of files, data stitching needs to be performed according to corresponding key values.

A neural network model recorded in this embodiment of this application is applicable to various fields, for example, the model may be a neural network for image recognition, a neural network for text recommendation, that is, the neural network model in this embodiment of this application is not limited to be applied to a specific field.

In the related art, feature stitching needs to be performed before model training. Feature stitching is an important module for machine learning modeling. In a modeling scenario in an industrial field, the samples and the features are both large-scale, a plurality of algorithms needs to be run in parallel, and as a result, stitching performance greatly affects efficiency of modeling. The feature stitching technology includes online real-time stitching and offline stitching.

Online real-time stitching is to generate a label according to a real-time user behavior, for example, in a click-rate scenario, a clicked sample is generally used as a positive sample, an exposed but not clicked sample is used as a negative sample, the samples are associated with features, to generate an input required for algorithm training. However, online real-time stitching is not applicable to a scenario determined in real time by a sample label and does not support multi-period historical cache reuse, a new scenario, algorithm hot start, historical data stitching.

Although offline stitching supports sample generation through historical data analysis. For the modeling scenario, a plurality of algorithms needs to be simultaneously run in parallel to update a model at a granularity of days, each sample stitching requires a historical period of more than 90 days, and the samples and the features are both on the order of hundreds of millions and have a very high requirement on performance. However, offline stitching does not meet the needs of large-scale stitching and is not applicable to multi-algorithm parallel running, and therefore, feature stitching cannot reuse cache.

To resolve the foregoing problems, embodiments of this application provide a method and apparatus for constructing a recommendation model and a neural network model, an electronic device, and a computer-readable storage medium, which can pre-aggregate a plurality of feature tables corresponding to application scenarios, so that an aggregated feature table may be reused by a training algorithm to perform training on the neural network model in the application scenario, and waste of computer resources is reduced, thereby improving efficiency of constructing the recommendation model.

The method for constructing a neural network model provided in this embodiment of this application may be independently implemented by a terminal/server, or may be collaboratively implemented by the terminal and the server. For example, the terminal independently performs a method for constructing a neural network model described below, or the terminal transmits a training request for a neural network model to the server, and the server performs the method for constructing a neural network model according to the received training request for a neural network model, and transmits a generated neural network model to the terminal, to predict a corresponding application indicator through the neural network model.

The electronic device for neural network model construction provided in this embodiment of this application may be a terminal device or server of any type. The server may be an independent physical server, or may be a server cluster including a plurality of physical servers or a distributed system, or may be a cloud server providing a cloud computing service. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this application.

Using the server as an example, for example, through a server cluster deployed in a cloud, AI as a Service (AIaaS) is available to the user, an AIaaS platform may split several common AI services and provide independent or packaged services in the cloud. Such a service mode is similar to an AI theme store, all users may access and use one or more AI services provided by the AIaaS platform through an application programming interface.

For example, one of the artificial intelligence services may be a neural network model construction service, that is, a program constructed by the neural network model provided in this embodiment of this application is encapsulated in the server in the cloud. A developer invokes the neural network model construction service in the cloud through the terminal (which runs a client, for example, configures the client), so that the server deployed in the cloud invokes the encapsulated program constructed by the neural network model, reads corresponding features from an aggregated feature table of a cache space, stitches the features with a sample data table to form a training sample set, and trains a neural network model in an application scenario based on any training algorithm and the training sample set, to predict, in response to a training request for the neural network model, a corresponding application indicator through the neural network model, where the neural network model may be an image neural network model, a text neural network model, and the like.

In an implementation scenario, to construct an image recognition neural network model, the server or the terminal may aggregate a plurality of feature tables corresponding to each application scenario in an image recognition project, and transmit an obtained aggregated feature table to a cache space, where the image recognition project includes a plurality of application scenarios in a one-to-one correspondence with a plurality of prediction indicators of a to-be-recognized object, an image recognition neural network model of each application scenario is configured to predict a corresponding prediction indicator; read corresponding object features from the aggregated feature table in the cache space based on object identifiers included in a sample data table, and stitch the feature with the sample data table to form a training sample set; and train the image recognition neural network model in the application scenario based on any one of a plurality of training algorithms and the training sample set, so that the image recognition neural network model can fit the object features in the training sample set, where the plurality of training algorithms are used for training the image recognition neural network model in the application scenario to predict the corresponding prediction indicator through the image recognition neural network model.

For example, in a face recognition system, functions constructed by the neural network model provided in this embodiment of this application are invoked. The image recognition project includes a front face recognition scenario and a side face recognition scenario, for example, for a front face, a front face feature is read from an aggregated feature table of a cache space based on a front face identifier included in a sample data table, the feature is stitched with the sample data table to form a training sample set, and a front-face recognition neural network model in a front-face recognition scenario is trained based on any one of a plurality of training algorithms and the training sample set, to predict a corresponding front face indicator corresponding to the front-face recognition neural network model, for example, a probability of a front face of a user. In this embodiment of this application, by using the front-face recognition neural network model and a side-face recognition neural network model, front face recognition and side-face recognition are performed on a pedestrian who needs to access a gate, to improve accuracy of facial recognition and strengthen a security coefficient of an access control.

In an implementation scenario, to construct a text recommendation neural network model, the server or the terminal may aggregate a plurality of feature tables corresponding to each application scenario in a text recommendation project, and transmit an obtained aggregated feature table to a cache space, where the text recommendation project includes a plurality of application scenarios in a one-to-one correspondence with a plurality of recommendation indicators of to-be-recommended text, a text recommendation neural network model of each application scenario is configured to predict a corresponding recommendation indicator; read a corresponding user feature and text feature from the aggregated feature table in the cache space based on a user identifier and a text identifier included in a sample data table, and stitch the feature with the sample data table to form a training sample set; and train the text recommendation neural network model in the application scenario based on any one of a plurality of training algorithms and the training sample set, so that the text recommendation neural network model can fit the object features in the training sample set, where the plurality of training algorithms are used for training the text recommendation neural network model in the application scenario to predict the corresponding recommendation indicator through the text recommendation neural network model.

For example, in a news recommendation system, functions constructed by the neural network model provided in this embodiment of this application are invoked. The text recommendation project includes a news click rate prediction scenario and a news exposure rate prediction scenario, for example, for a news click rate, a corresponding user feature and news feature are read from an aggregated feature table of a cache space based on a user identifier and a news identifier included in a sample data table, the feature is stitched with the sample data table to form a training sample set, and a click rate prediction model of the news click rate prediction scenario is trained based on any one of a plurality of training algorithms and the training sample set, to predict a corresponding click rate by using the click rate prediction model. In this embodiment of this application, a click rate and an exposure rate of news are predicted by using the click rate prediction model and an exposure prediction model, and whether the new is to be recommended is determined with reference to the click rate and the exposure rate, to improve accuracy of news recommendation and recommend news in which the user is more interested.

A specific description is made below with reference to the recommendation model. Referring to FIG. 1, FIG. 1 is a schematic diagram of an application scenario of a recommendation system 10 according to an embodiment of this application. A terminal 200 are connected to a server 100 through a network 300. The network 300 may be a wide area network, a local area network, or a combination of the wide area network and the local area network.

The terminal 200 (which runs a client, for example, configures the client) may be configured to obtain a training request for a recommendation model, for example, the terminal automatically obtains the training request for the recommendation model after the user inputs a plurality of feature tables corresponding to an application scenario into the client.

In some embodiments, a recommendation model construction plug-in may be embedded into the client running on the terminal, to locally implement the method for constructing a recommendation model in the client. For example, after obtaining the training request for the recommendation model, the terminal 200 invokes the recommendation model construction plug-in to implement the method for constructing a recommendation model; reads a corresponding user feature and item feature from an aggregated feature table of a cache space, and stitches the features with a sample data table to form a training sample set; and trains the recommendation model of the application scenario based on any one of training algorithms and the training sample set, to subsequently predict, in response to the training request for the recommendation model, a corresponding recommendation indicator according to the recommendation model, for example, an exposure rate of a commodity is predicted by using the recommendation model, and whether to recommend the commodity is determined based on the exposure rate of the commodity, thereby helping the user discover a commodity in which the user may be interested.

In some embodiments, the terminal 200 invokes a recommendation model construction interface (which may be provided in the form of a cloud service, that is, a recommendation model construction service) of the server 100 after obtaining the training request for the recommendation model, and the server 100 reads a corresponding user feature and item feature from an aggregated feature table of a cache space, and stitches the features with a sample data table to form a training sample set, and trains the recommendation model of the application scenario based on any one of training algorithms and the training sample set, to respond to the training request for the recommendation model.

In some embodiments, the terminal or the server may implement the method for constructing a recommendation model provided in this embodiment of this application by running a computer program, for example, the computer program may be a native program or a software module in an operating system; a native application (APP), that is, an application that needs to be installed in the operating system for running; a mini program, that is, a program that can be run simply by downloading the program into a browser environment; or may be a mini program that can be embedded into any APP. Based on the above, the computer program may be an application, module, or plug-in in any form.

The structure of the electronic device for recommendation model construction provided in this embodiment of this application is described below. Referring to FIG. 2, FIG. 2 is a schematic structural diagram of an electronic device 500 for recommendation model construction according to an embodiment of this application. The description is made by using an example in which the electronic device 500 is a server, the electronic device 500 for recommendation model construction shown in FIG. 2 includes: at least one processor 510, a memory 550, and at least one network interface 520. All the components in the electronic device 500 are coupled together by using a bus system 530. It may be understood that the bus system 530 is configured to implement connection and communication between the components. In addition to a data bus, the bus system 530 further includes a power bus, a control bus, and a status signal bus. However, for ease of clear description, all types of buses are marked as the bus system 530 in FIG. 2.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 550 includes a volatile memory or a non-volatile memory, or may include both a volatile memory and a non-volatile memory. The non-volatile memory may be a read-only memory (ROM), and the volatile memory may be a random access memory (RAM). The memory 550 described in the embodiments of this application is to include any other suitable type of memories. The memory 550 optionally includes one or more storage devices physically away from the processor 510.

In some embodiments, the memory 550 may store data to support various operations. Examples of the data include programs, modules, and data structures, or a subset or a superset thereof. The descriptions are made below by using examples.

An operating system 551 includes a system program configured to process various basic system services and perform a hardware-related task, for example, a framework layer, a core library layer, and a driver layer, and is configured to implement various basic services and process a hardware-related task.

A network communication module 553 is configured to reach another computing device through one or more (wired or wireless) network interfaces 520. Exemplary network interfaces 520 include: Bluetooth, wireless compatible authentication (Wi-Fi), a universal serial bus (USB), and the like.

In some embodiments, an apparatus for constructing a recommendation model provided in this embodiment of this application may be implemented in a form of a software, which may be, for example, the foregoing recommendation model construction plug-in in the terminal or the foregoing recommendation model construction service in the server. Certainly, the apparatus is not limited to the foregoing description. The apparatus for constructing a recommendation model provided in this embodiment of this application may be provided as various software embodiments, and various forms such as an application, software, a software module, a script, or code.

FIG. 2 shows an apparatus 555 for constructing a recommendation model stored in the memory 550, which may be software in a form of a program or a plug-in, for example, the recommendation model construction plug-in, and includes a series of modules, including a first aggregation module 5551, a first stitching module 5552, and a first training module 5553. The first aggregation module 5551, the first stitching module 5552, and the first training module 5553 are configured to implement recommendation model construction functions provided in this embodiment of this application.

The method for constructing a neural network model provided in this embodiment of this application may be implemented by various types of electronic devices, for example, a server. Referring to FIG. 3, FIG. 3 is a schematic flowchart of a method for constructing a neural network model according to an embodiment of this application. The description is made below with reference to steps shown in FIG. 3.

A neural network model recorded in this embodiment of this application is applicable to various fields, for example, the model may be a neural network for image recognition, a neural network for text recommendation, that is, the neural network model in this embodiment of this application is not limited to be applied to a specific field.

In the following steps, an application project represents a specific application task, for example, facial recognition, text recommendation, and the like. An application scenario represents a scenario corresponding to a sub-task in the application project, for example, a front-face recognition scenario and a side-face recognition scenario in a facial recognition scenario. A feature table includes a plurality of feature key-value pairs.

In step 101, a plurality of feature tables corresponding to each application scenario in an application project are aggregated, and an obtained aggregated feature table is transmitted to a cache space;

the application project including a plurality of application scenarios in a one-to-one correspondence with a plurality of application indicators, a neural network model of each application scenario being configured to predict a corresponding application indicator.

For example, a central processing unit (CPU) of the server obtains a plurality of feature tables corresponding to each application scenario in an application project from a file system in advance, pre-aggregates the plurality of feature tables to obtain an aggregated feature table of the application scenario, and transmits the aggregated feature table to a cache space (which is a high-speed memory, a database, and the like), to facilitate subsequent reuse of the aggregated feature table, and avoid stitching to be performed on the feature tables for each training, thereby reducing computation complexity.

In some embodiments, the aggregating a plurality of feature tables corresponding to each application scenario in a recommendation project includes: performing the following processing on each application scenario in the application project: aggregating and deduplicating at least a part of features of the plurality of feature tables corresponding to the application scenario, to obtain an aggregated feature table of the application scenario.

For example, since the aggregated feature table is a wide table, feature identifiers in the aggregated feature table may be combined to obtain a feature metadata table of the application scenario to quickly determine to-be-stitched features in the aggregated feature table subsequently, where the feature metadata table includes information such as a feature identifier, a source of the feature (which feature table the feature sources from), a location of the feature in the aggregated feature table, and the like. Subsequently, a feature may be indexed from the feature metadata table, and when the feature is indexed, it indicates that the feature exists in the aggregated feature table, and the feature is read from the aggregated feature table.

In some embodiments, the aggregating at least a part of features of the plurality of feature tables corresponding to the application scenario includes: aggregating all features of the plurality of feature tables corresponding to the application scenario.

For example, the central processing unit reads all features of the plurality of feature tables, and aggregates all features to obtain an aggregated feature table including all features. Therefore, a subsequent stitching operation may directly read features from the aggregated feature table as long as there is no newly added feature table, that is, the aggregated feature table may not omit any feature in the feature tables.

In some embodiments, the aggregating at least a part of features of the plurality of feature tables corresponding to the application scenario includes: determining, from the plurality of feature tables corresponding to each application scenario in the application project, features publicly used by a plurality of training algorithms for training the recommendation model of the application scenario; and aggregating the publicly used features, to obtain the aggregated feature table of the application scenario.

For example, since features used by training algorithms are different, features publicly used by a plurality of training algorithms are pre-aggregated, that is, features of higher frequency are aggregated to obtain an aggregated feature table of the application scenario, to improve the frequency of reading features from the aggregated feature table and reduce the size of the aggregated feature table, thereby subsequently facilitating in quickly reading the features from the aggregated feature table.

In some embodiments, when there is a newly added feature table in the application scenario, the newly added feature table and the aggregated feature table of the application scenario are stitched to obtain a new aggregated feature table, and the cache space is incrementally updated based on the new aggregated feature table.

For example, when detecting that there is a newly added feature table in the file system, the central processing unit may read the aggregated feature table of the application scenario from the cache space, read the newly added feature table from the file system, stitch the newly added feature table with the aggregated feature table of the application scenario to obtain a new aggregated feature table, and incrementally update the cache space based on the new aggregated feature table to replace an old aggregated feature table.

In some embodiments, the aggregating a plurality of feature tables corresponding to each application scenario in an application project includes: aggregating newly added feature tables corresponding to new periods when each new period of each application scenario arrives, to obtain an aggregated feature table of the new period; and stitching aggregated feature tables of new periods, to obtain the aggregated feature table of the application scenario.

For example, feature tables of each application scenario correspond to an update period, for example, a monthly update period, a weekly update period, and a daily update period. When each new period of each application scenario arrives, a plurality of feature tables corresponding to the new period are aggregated to obtain an aggregated feature table of the new period, for example, for each month, feature tables of the monthly update period are aggregated to obtain an aggregated feature table for each month; and for each week, feature tables of the weekly update period are aggregated to obtain an aggregated feature table for each week; and for each week, feature tables of the daily update period are aggregated to obtain an aggregated feature table for each day. In addition, aggregated feature tables of the new periods are stitched, to obtain the aggregated feature table of the application scenario.

Original features are divided according to the update period. There are a set of aggregation tasks for each day, week, and month, where a month feature table only needs to be calculated once a month, a week feature table only needs to be calculated once a week, and a day feature table only needs to be calculated once a day, so that features of corresponding periods are separately aggregated, and then a day-level merging task is started again. Therefore, there is no need to aggregate features in all feature tables, and instead, aggregated features of month, week, and day result tables (an aggregated feature table, for example, a monthly aggregated feature table, a weekly aggregated feature table, and a daily aggregated feature table) are combined, so that performance is greatly improved by calculating in such a manner. For example, the features of the corresponding periods are separately aggregated to obtain an aggregated feature table of June, an aggregated feature table of the first week, and an aggregated feature table of June 1, and then the day-level merging task is started again, that is, the aggregated feature table of June, the aggregated feature table of the first week, and the aggregated feature table of June 1 are aggregated to obtain the aggregated feature table of the application scenario, so that for the daily update period, all feature tables in the application scenario is prevented from being aggregated every day, thereby reducing computation resources.

In some embodiments, after obtaining the aggregated feature tables of the new period, the central processing unit incrementally update the cache space based on the aggregated feature tables of the new periods. When any new period of each application scenario does not arrive, before the aggregated feature tables of the new periods are stitched, an aggregated feature table of a historical period corresponding to the new period is read from the cache space as the aggregated feature table of the new period, the historical period corresponding to the new period being a period before the new period.

The aggregated feature table of the new period is used as an aggregated feature table of a historical period corresponding to a next new period. When any new period of each application scenario arrives, the aggregated feature table of the historical period corresponding to the new period is read from the cache space and is used as the aggregated feature table of the new period, for example, for the monthly update period, when an update moment of each month has not arrived, an aggregated feature table (an aggregated feature table of a historical period) of a month closest to the month is read from the cache space as an aggregated feature table of the month, and the aggregated feature tables of the new periods are stitched to obtain the aggregated feature table of the application scenario.

FIG. 4 and FIG. 4 are schematic flowcharts of a method for constructing a neural network model according to an embodiment of this application. FIG. 4 illustrates that step 101 shown in FIG. 3 may be implemented by performing step 1011 to step 1013 shown in FIG. 4. In step 1011, feature identifiers in the obtained aggregated feature table are mapped, to obtain integer values of the feature identifiers. In step 1012, the feature identifiers in the aggregated feature table are updated to the integer values, to obtain a compressed aggregated feature table. In step 1013, the compressed aggregated feature table is transmitted to the cache space.

For example, since the aggregated feature table is a wide table, and for ease of understanding, the feature identifier is relatively long, a storage space of the aggregated feature table is relatively large. To save the storage space of the aggregated feature table, the feature identifiers of the aggregated feature table may be mapped to obtain integer values of the feature identifier and reduce the length of the feature identifiers, and the feature identifiers in the aggregated feature table are updated to the integer values to obtain a compressed aggregated feature table; and the compressed aggregated feature table is transmitted to the cache space, thereby reducing the cache space occupied by the aggregated feature table, and improving read capability of the aggregated feature table.

In step 102, corresponding features are read from the aggregated feature table in the cache space based on feature identifiers included in a sample data table, and the features are stitched with the sample data table, to form a training sample set, the sample data table including a plurality of samples, each sample including a plurality of feature identifiers. Before performing a stitching operation, the developer may input a sample data table and training algorithms into the terminal, the terminal automatically obtains a training request based on the sample data table and the training algorithms and transmits the training request based on the sample data table and the training algorithms to the server, and the server receives the training request based on the sample data table and the training algorithms, reads corresponding features from the aggregated feature table in the cache space based on feature identifiers included in the sample data table, and stitches the features with the sample data table to form a training sample set, thereby achieving reuse of the aggregated feature table, and quickly performing the stitching operation on the sample data table.

In some embodiments, when corresponding features are not read from the aggregated feature table in the cache space, the corresponding features are read from the plurality of feature tables corresponding to the application scenario, and the features are stitched with the sample data table to form the training sample set.

For example, the central processing unit preferentially reads features corresponding to the sample data table from feature tables in the cache space, reads a plurality of feature tables corresponding to the application scenario from the file system when the features corresponding to the sample data table are not read from the feature tables in the cache space, and reads the features corresponding to the sample data table from the plurality of feature tables, to avoid reading features from the file system every time, so that a feature reading rate may be greatly improved by reading features from the cache space.

In some embodiments, the reading corresponding features from the aggregated feature table in the cache space based on feature identifiers included in a sample data table, and stitching the features with the sample data table includes: performing the following processing when each new period of each application scenario arrives: reading corresponding features from an aggregated feature table of the new period of the cache space based on feature identifiers included in a sample data table of the new period; and stitching the features with the sample data table of the new period, to obtain cache features of the new period.

For example, samples of a plurality of historical periods are required for modeling in most application scenarios, to construct sufficient training data, to enable the algorithm to learn more, thereby improving robustness. For example, the model is updated every day, samples of a month (30 periods) are required, and it is necessary to record sample data of 30 periods. When any of the 30 periods arrives, corresponding features are read from an aggregated feature table of the period of the cache space based on feature identifiers included in a sample data table of the period, and the features are stitched with the sample data table of the period, to obtain cache features of the period.

In some embodiments, after obtaining the cache features of the new period, the central processing unit incrementally updates the cache space based on the cache features of the new period. reads a plurality of cache features of a historical period corresponding to the new period from the cache space; and stitches the plurality of cache features of the historical period with the cache feature of the new period, to obtain the training sample set of the application scenario, the historical period being a period before the new period.

The cache features of the new period are used as cache features of a historical period corresponding to a next new period. As shown in FIG. 5, after obtaining cache features of the $30^{th}$ period (cache feature of a new period), the central processing unit obtains cache feature of the first period to the $29^{th}$ period from the cache space and stitches the cache feature of the first period to the $30^{th}$ period, to obtain a training sample set of the application scenario.

In some embodiments, after the training sample set is formed, primary key encoding is performed on a feature identifier of each training sample of the training sample set, to obtain a primary key encoded value of the feature identifier; secondary key encoding is performed on the feature identifier of each training sample, to obtain a secondary key encoded value of the feature identifier; the primary key encoded value and the secondary key encoded value are stitched, to obtain an index encoded value of the feature identifier; updating the feature identifier of the training sample to the index encoded value, to obtain an updated training sample and train the recommendation model of the application scenario based on the updated training sample.

For example, after obtaining the training sample set, the central processing unit performs encoding on each training sample in the training sample set to obtain a format for model training, and compresses the training samples, to reduce a storage space of the training samples. Primary key encoding and secondary key encoding, that is, 2-level encoding, is performed on the feature identifier of the training sample to obtain an index encoded value of the feature identifier. The index encoded value may effectively reduce a conflict rate of encoding, that is, the index encoded value may uniquely represent the feature identifier.

In step 103, the neural network model of the application scenario is trained based on the training sample set, so that the neural network model can fit features in the training sample set.

The neural network model of the application scenario is trained based on any one of the plurality of training algorithms and the training sample set, so that the neural network model can fit the features in the training sample set, the plurality of training algorithms being used for training the neural network model of the application scenario, the training algorithm including a hyperparameter, a loss function, and the like of the model. After obtaining the training sample set, the central processing unit may train the neural network model of the application scenario based on any one of the plurality of training algorithms and the training sample set, to construct the neural network model of the application scenario, and predict a corresponding application indicator through the neural network model of the application scenario. For example, the neural network model of the application scenario includes a front-face recognition neural network model and a side-face recognition neural network model. The front-face recognition neural network model is configured to predict a category of a front face (a probability of a front face of a user), and the side-face recognition neural network model is configured to predict a category of a side face (a probability of a side face of a user).

The method for constructing a recommendation model provided in this embodiment of this application is described below with reference to an exemplary application and implementation of the electronic device provided in this embodiment of this application. Referring to FIG. 6, FIG. 6 is a schematic flowchart of a method for constructing a recommendation model according to an embodiment of this application. The description is made below with reference to steps shown in FIG. 6.

In the following steps, the recommendation project represents a specific recommendation object, for example, news, a commodity, a video, and the like.

In step 201, a plurality of feature tables corresponding to each application scenario in a recommendation project are aggregated, and an obtained aggregated feature table is transmitted to a cache space, the recommendation project including a plurality of application scenarios in a one-to-one correspondence with a plurality of recommendation indicators of a to-be-recommended item, a recommendation model of each application scenario being configured to predict a corresponding recommendation indicator.

For example, a central processing unit of the server obtains a plurality of feature tables corresponding to each application scenario in a recommendation project from a file system in advance, pre-aggregates the plurality of feature tables to obtain an aggregated feature table of the application scenario, and transmits the aggregated feature table to a cache space, to facilitate subsequent reuse of the aggregated feature table, and avoid stitching to be performed on the feature tables for each training, thereby reducing computation complexity.

In some embodiments, the aggregating a plurality of feature tables corresponding to each application scenario in a recommendation project includes: performing the following processing on each application scenario in the recommendation project: aggregating and deduplicating at least a part of features of the plurality of feature tables corresponding to the application scenario, to obtain an aggregated feature table of the application scenario. combining feature identifiers in the aggregated feature table, to obtain a feature metadata table of the application scenario. Subsequently, a feature may be indexed from the feature metadata table, and when the feature is indexed, it indicates that the feature exists in the aggregated feature table, and the feature is read from the aggregated feature table.

In some embodiments, the aggregating at least a part of features of the plurality of feature tables corresponding to the application scenario includes: aggregating all features of the plurality of feature tables corresponding to the application scenario.

In some embodiments, the aggregating at least a part of features of the plurality of feature tables corresponding to the application scenario includes: determining, from the plurality of feature tables corresponding to each application scenario in the recommendation project, features publicly used by a plurality of training algorithms for training the recommendation model of the application scenario; and aggregating the publicly used features, to obtain the aggregated feature table of the application scenario.

In some embodiments, when there is a newly added feature table in the application scenario, the newly added feature table and the aggregated feature table of the application scenario are stitched to obtain a new aggregated feature table, and the cache space is incrementally updated based on the new aggregated feature table.

For example, when detecting that there is a newly added feature table in the file system, the central processing unit may read the aggregated feature table of the application scenario from the cache space, read the newly added feature table from the file system, stitch the newly added feature table with the aggregated feature table of the application scenario to obtain a new aggregated feature table, and incrementally update the cache space based on the new aggregated feature table to replace an old aggregated feature table.

In some embodiments, the aggregating a plurality of feature tables corresponding to each application scenario in a recommendation project includes: aggregating newly added feature tables corresponding to new periods when each new period of each application scenario arrives, to obtain an aggregated feature table of the new period; and stitching aggregated feature tables of new periods, to obtain the aggregated feature table of the application scenario.

In some embodiments, after obtaining the aggregated feature tables of the new period, the central processing unit incrementally update the cache space based on the aggregated feature tables of the new periods. When any new period of each application scenario does not arrive, before the aggregated feature tables of the new periods are stitched, an aggregated feature table of a historical period corresponding to the new period is read from the cache space as the aggregated feature table of the new period, the historical period corresponding to the new period being a period before the new period.

The aggregated feature table of the new period is used as an aggregated feature table of a historical period corresponding to a next new period. When any new period of each application scenario arrives, the aggregated feature table of the historical period corresponding to the new period is read from the cache space and is used as the aggregated feature table of the new period, for example, for the monthly update period, when an update moment of each month has not arrived, an aggregated feature table (an aggregated feature table of a historical period) of a month closest to the month is read from the cache space as an aggregated feature table of the month, and the aggregated feature tables of the new periods are stitched to obtain the aggregated feature table of the application scenario.

In some embodiments, the transmitting an obtained aggregated feature table to a cache space includes: mapping feature identifiers in the obtained aggregated feature table, to obtain integer values of the feature identifiers; updating the feature identifiers in the aggregated feature table to the integer values, to obtain a compressed aggregated feature table; and transmitting the compressed aggregated feature table to the cache space.

In step 202, a corresponding user feature and item feature are read from the aggregated feature table in the cache space based on a user identifier and an item identifier included in a sample data table, and the features are stitched with the sample data table, to form a training sample set, the sample data table including a plurality of samples, each sample including a plurality of feature identifiers, for example, the user identifier and the item identifier. Before performing a stitching operation, the developer may input a sample data table and training algorithms into the terminal, the terminal automatically obtains a training request based on the sample data table and the training algorithms and transmits the training request based on the sample data table and the training algorithms to the server, and the server receives the training request based on the sample data table and the training algorithms, reads a corresponding user feature and item feature from the aggregated feature table in the cache space based on a user identifier and an item identifier included in the sample data table, and stitches the features with the sample data table to form a training sample set, thereby achieving reuse of the aggregated feature table, and quickly performing the stitching operation on the sample data table.

In some embodiments, a corresponding user feature or item feature is read from the plurality of feature tables corresponding to the application scenario when the corresponding user feature or item feature is not read from the aggregated feature table in the cache space, and the feature is stitched with the sample data table, to form a training sample set.

For example, the central processing unit preferentially reads a user feature or item feature corresponding to the sample data table from feature tables in the cache space, reads a plurality of feature tables corresponding to the application scenario from the file system when the user feature or the item feature corresponding to the sample data table is not read from the feature tables in the cache space, and reads the user feature or the item feature corresponding to the sample data table from the plurality of feature tables, to avoid reading the user feature or the item feature from the file system every time, so that a feature reading rate may be greatly improved by reading the user feature or the item feature from the cache space.

In some embodiments, the reading a corresponding user feature and item feature from the aggregated feature table in the cache space based on a user identifier and an item identifier included in a sample data table, and stitching the features with the sample data table includes: performing the following processing when each new period of each application scenario arrives: reading a corresponding user feature and item feature from an aggregated feature table of the new period of the cache space based on a user identifier and an item identifier included in a sample data table of the new period; and stitching the user feature, the item feature, and the sample data table of the new period, to obtain a cache feature of the new period.

For example, samples of a plurality of historical periods are required for modeling in most application scenarios, to construct sufficient training data, to enable the algorithm to learn more, thereby improving robustness. For example, the model is updated every day, samples of a month (30 periods) are required, and it is necessary to record sample data of 30 periods. When any of the 30 periods arrives, a corresponding user feature and item feature are read from an aggregated feature table of the period of the cache space based on a user identifier and an item identifier included in a sample data table of the period, and the user feature and item feature are stitched with the sample data table of the period, to obtain cache features of the period.

In some embodiments, after obtaining the cache features of the new period, the central processing unit incrementally updates the cache space based on the cache features of the new period. reads a plurality of cache features of a historical period corresponding to the new period from the cache space; and stitches the plurality of cache features of the historical period with the cache feature of the new period, to obtain the training sample set of the application scenario, the historical period being a period before the new period.

The cache features of the new period are used as cache features of a historical period corresponding to a next new period. As shown in FIG. 5, after obtaining cache features of the $30^{th}$ period (cache feature of a new period), the central processing unit obtains cache feature of the first period to the $29^{th}$ period from the cache space and stitches the cache feature of the first period to the $30^{th}$ period, to obtain a training sample set of the application scenario.

In some embodiments, after the training sample set is formed, primary key encoding is performed on a feature identifier of each training sample of the training sample set, to obtain a primary key encoded value of the feature identifier; secondary key encoding is performed on the feature identifier of each training sample, to obtain a secondary key encoded value of the feature identifier; the primary key encoded value and the secondary key encoded value are stitched, to obtain an index encoded value of the feature identifier; updating the feature identifier of the training sample to the index encoded value, to obtain an updated training sample and train the recommendation model of the application scenario based on the updated training sample.

In step 203, the recommendation model of the application scenario is trained based on the training sample set, so that the recommendation model can fit the user feature and the item feature in the training sample set.

The recommendation model of the application scenario is trained based on any one of the plurality of training algorithms and the training sample set, so that the recommendation model can fit the user feature and the item feature in the training sample set, the plurality of training algorithms being used for training the recommendation model of the application scenario, the training algorithm including a hyperparameter, a loss function, and the like of the model. After obtaining the training sample set, the central processing unit may train the recommendation model of the application scenario based on any one of the plurality of training algorithms and the training sample set, to construct the recommendation model of the application scenario, and predict a corresponding recommendation indicator through the recommendation model of the application scenario. For example, the recommendation model of the application scenario includes a click-rate prediction model and an exposure-rate prediction model, the click-rate prediction model being configured to predict a click rate of an advertisement, and the exposure-rate prediction model being configured to predict an exposure rate of the advertisement.

The following describes an exemplary application of this embodiment of this application in an actual application scenario.

Online real-time stitching in the related art is not applicable to a scenario determined in real time by a sample label and does not support multi-period historical cache reuse, a new scenario, algorithm hot start, historical data stitching. Although offline stitching supports sample generation through historical data analysis. For the modeling scenario, a plurality of algorithms needs to be simultaneously run in parallel to update a model at a granularity of days, each sample stitching requires a historical period of more than 90 days, and the samples and the features are both on the order of hundreds of millions and have a very high requirement on performance. However, offline stitching does not meet the needs of large-scale stitching and is not applicable to multi-algorithm parallel running, and therefore, feature stitching cannot reuse cache.

To resolve the foregoing problems, an embodiment of this application provides a high-performance stitching method (that is, the method for constructing a neural network model), the method adopts a multi-level caching mechanism, that is, first-level caching and second-level caching. 1) First-level caching: It is divided according to algorithm application scenarios and used features. Since there are many features publicly used by similar algorithms in the same application scenario, outer-layer pre-aggregation may be performed to generate an aggregated feature table, and each algorithm preferentially uses an aggregated feature in the aggregated feature table when executing a specific stitching logic, to avoid that each algorithm needs to join the sample with all feature tables and waste computation resources. The storage occupied by the aggregated features is relatively large, and loading features in a subsequent calculation link consumes a longer time. In view of this, compression optimization is performed by mapping feature keys (feature identifiers) to integer values. 2) Second-level caching: During specific algorithm stitching, results of multi-period stitching (cache features) are cached, for example, in a daily update scenario of the model, samples of more than 3 months usually needs to be stitched, but full update cannot be performed every day. Plaintext feature caching and landing are performed on stitching results of a historical sample period, so that only incremental stitching needs to be performed on new period samples, thereby effectively resolving the performance problem. Finally, the stitched features need to be encoded for algorithm training. Stitched feature keys of a plurality of periods are encoded in a hashing manner. Compared with full feature statistical encoding, the performance is significantly improved in this embodiment of this application.

This embodiment of this application is applicable to various machine learning modeling scenarios. An offline configuration algorithm corresponds to a sample, a feature, a quantity of periods to be stitched, and the like, and sample and feature stitching and encoding are performed to generate algorithm training data (training samples). Sub-application scenario modeling is performed. Since features used by an algorithm in the same application scenario are highly coincided, first-level caching is performed according to a scenario dimension, and an algorithm set in the scenario may share an aggregated feature table of first-level caching. Second-level cache is stitched and configured inside the algorithm, for example, for the daily update model, when features does not change, routine stitching calculation may be implemented only by incrementally stitching new periods.

As shown in FIG. 7, FIG. 7 is a schematic flowchart of stitching offline features according to an embodiment of this application. Three elements for feature stitching includes: algorithm, sample, and feature. Samples and features are stitched (that is, a join operation performed in a database) based on the features used by an algorithm, the samples and all feature tables joined to generate a stitching result, and the stitching result is inputted into the algorithm for training. Since there are many parallel algorithms, a lot of join operations have poor performance. The join operations performed on a plurality of tables on the order of hundreds of millions consumes much time, and each algorithm needs to be calculated once, for example, in a scenario 1, most features of an algorithm 1 and an algorithm 2 are overlapped, or the algorithms have exactly the same features with only algorithm parameter different. To verify the effect, multi-table feature join operation needs to be performed on each algorithm, and when k periods are required, such an operation needs to be repeated k times during stitching of each algorithm, which requires unbearable computation resources and high time consumption.

To resolve the foregoing problems, in this embodiment of this application, pre-aggregation is performed through first-level cache in multi-level cache, to avoid that each algorithm needs to join the samples with all feature tables and waste computation resources. As shown in FIG. 8, FIG. 8 is a schematic flowchart of first-level cache according to an embodiment of this application. The same modeling application scenario has the following features: there are many algorithms, and features used by the algorithms are highly coincided. In view of this, some feature processing logic may be placed in a front public module. All features (where the features are distributed in feature tables, and the feature tables are loaded to obtain the features) in the application scenario (for example, the scenario 1 is a commodity click-rate prediction scenario, and the scenario 2 is a commodity exposure-rate prediction scenario) are pre-aggregated to generate a metadata table (which records feature information of each period, for example, an identifier of an aggregated feature) of aggregated features and an aggregated feature table (which includes all feature sets in the scenarios, that is, a wide table including all aggregated features). During stitching calculation, the algorithm first views aggregated feature information from the metadata table, that is, preferentially loads features from the aggregated feature table for stitching, and when there are newly added features, bypass logic is executed to load the newly added features from an original feature table and then stitch the newly added features with the aggregated features, so that a plurality of algorithms publicly use a pre-aggregated feature table instead of joining with a plurality of external wide table.

Pre-aggregating features based on the application scenario can undoubtedly greatly improve the algorithm stitching performance later, and a plurality of algorithms can reuse aggregated feature tables to reduce a time consumed for multi-table joining. However, addition, deletion, and modification operations are often performed on feature in the application scenario. For a new aggregated period, newly added features may be added to cache, but features of a historical period cannot be recalculated. This is because an online task has been using the cache, and recalculation may lead to high risks. In view of this, this embodiment of this application provides the following solutions:

1. Keep aggregated historical period cache unchanged, to ensure that cache used for online stitching is not affected by recalculation.

2. Deleted features are simply processed. When original features are off-line and historical periods in the aggregated feature table are unchanged, aggregated deleted features of new periods may not appear in a stitching result. For newly added features and modified features, since historically cached stitching features have been generated and cannot be recalculated, an accompanying task is added, and the newly added features and the modified features are added to accompanying task-configuration meta-information. Processing such as calculation and storage of such a part of features are store from a main process, and a calculation state is maintained through a configuration metabase. For example, a main task is A, an accompanying task is B, a metadata table of the main task is meta_A, a metadata table of the accompanying task is meta_B, and there are four features: feature_1, feature_2, feature_3, feature_4, where feature_1, and feature_2 are routinely in a main task aggregated result, feature_3 is a newly added feature, and feature_4 is a modified feature, a task A aggregated feature table is merge_A, and a task B aggregated feature table is merge_B. When stitching calculation is performed by a specific algorithm, meta_A and meta_B may be simultaneously loaded, the newly added feature feature_3 and the modified feature feature_4 are obtained from meta_B, features are loaded from merge_B, and feature_1 and feature_2 are read from meta_A and merge_A, to ensure that the historical period features may be obtained from a correct place, two sets of task calculations are separated from storage without affecting online task execution.

3. Storage and calculation are separated, two sets of mechanisms are maintained, to resolve the problem such as feature addition, deletion, and modification, consistency of historical cache periods, and the like.

For a feature aggregation optimization policy: feature pre-aggregation is a previous process, and an aggregation task also requires high performance when the model is updated every day. Original features in the application scenario are usually divided into: month, week, day. When only full aggregation is performed, the task needs to be routinely calculated every day, and all features are aggregated. The aggregated features are distributed into a plurality of different wide tables, and multi-table join operation also needs to be performed, and the tables are on the order of more than 1 billion. The amount of features is divided according to a scenario dimension, more than 10,000-dimensional feature needs to be stitched with dozens of external tables, dozens of terabytes are required for storage, and therefore it is unacceptable that fully calculating every day wastes resources and consumes much time.

Figures 9, 10:
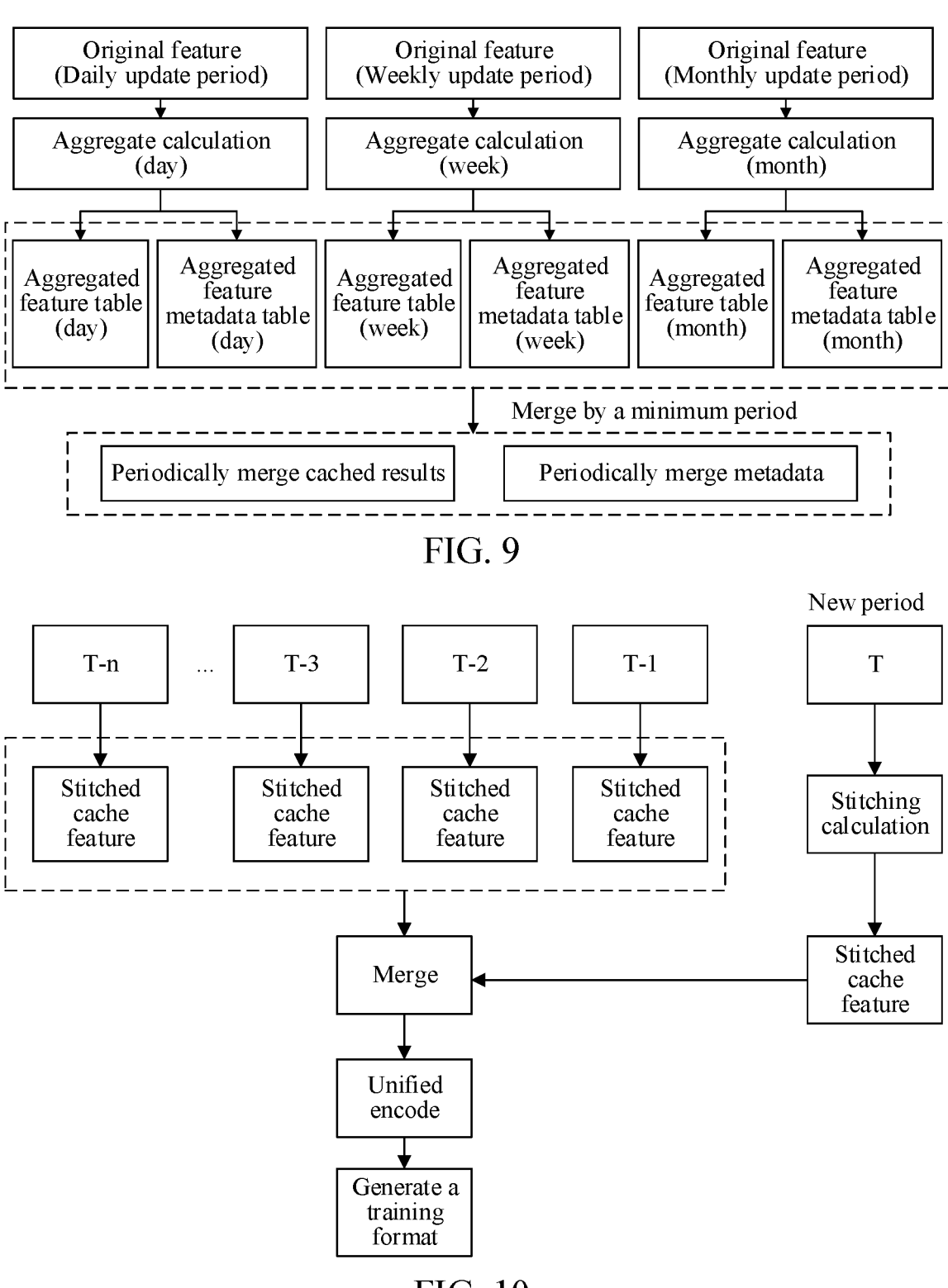
FIG. 9 is a schematic flowchart of sub-period feature aggregation according to an embodiment of this application.
FIG. 10 is a schematic flowchart of stitching historical features according to an embodiment of this application.
Figure 11:
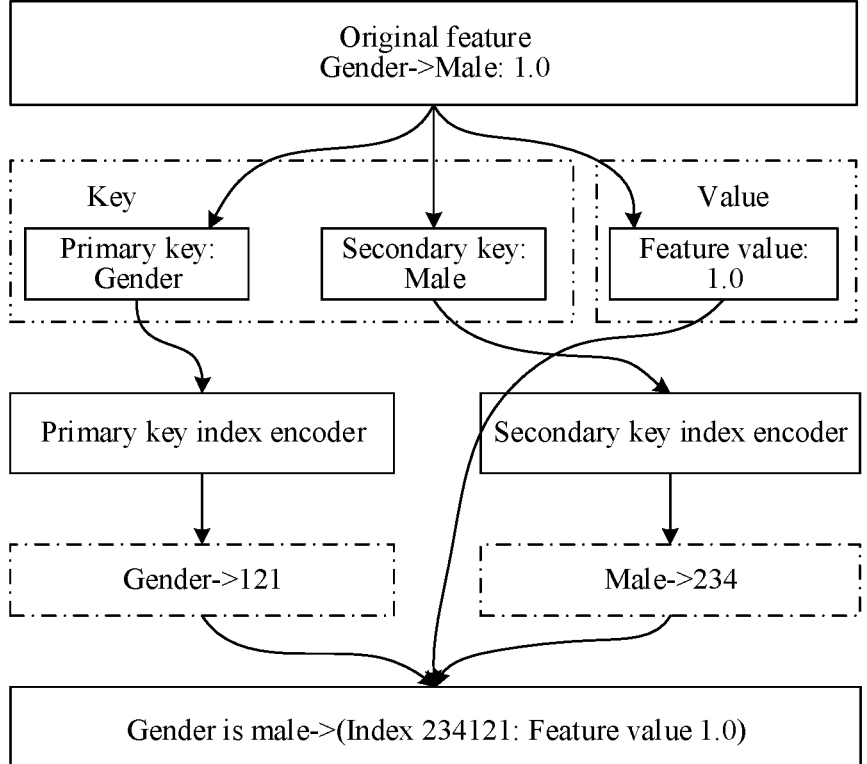
FIG. 11 is a schematic flowchart of 2-level index according to an embodiment of this application.

In view of this, as shown in FIG. 9, FIG. 9 is a schematic flowchart of sub-period feature aggregation according to an embodiment of this application. In this embodiment of this application, original features are divided according to the update period. There are a set of aggregation tasks for each day, week, and month, where a month feature table only needs to be calculated once a month, and a week feature table only needs to be calculated once a week, so that features of corresponding periods are separately aggregated, and then a day-level merging task is started again. Therefore, there is no need to join features in all tables, and instead, aggregated features of month, week, and day result tables (aggregated feature tables, for example, a monthly aggregated feature table, a weekly aggregated feature table, and a daily aggregated feature table) are combined, so that performance is greatly improved by calculating in such a manner.

To verify the effect of sub-period aggregation, experiments were conducted on monthly feature aggregation, weekly feature aggregation, daily feature aggregation, sub-period aggregation, and full feature aggregation, and experimental results were obtained as shown in Table 1:

TABLE 1

| Period | Amount of features | Number of times of running | Time (average) | Time (median) | Time (max) |
|---|---|---|---|---|---|
| Monthly feature aggregation | 1 billion * 500 | 10 | 553 mins | 600 mins | 650 mins |
| Weekly feature aggregation | 1 billion * 80 | 10 | 120 mins | 135 mins | 153 mins |
| Daily feature aggregation | 1 billion * 20 | 10 | 25 mins | 34 mins | 47 mins |
| Periodic aggregation | 1 billion * 600 | 10 | 29 mins | 29 mins | 32 mins |
| Full aggregation | 1 billion * 600 | 10 | 712 mins | 756 mins | 817 mins |

Based on the verification of actual application scenario data, compared with sub-period aggregation, full aggregation performed on monthly, weekly, and daily period feature tables improves the performance by more than 15 times, which greatly resolves the problem of feature aggregation performance in an actual application scenario.

For storage optimization: pre-aggregation optimization significantly improves the performance. Since features used by all algorithms in a scenario are aggregated, storage of aggregated features is particularly large. Feature tables have more than 1 billion records, more than 1,000 features, and generates aggregated table of more than 50 T. Therefore, subsequent loading in a calculation link is extremely time-consuming and requires a large amount of computer resources. Based on analysis, in this embodiment of this application, it is found that feature keys occupy more storage, and named feature keys are usually longer to better understand the description of features. Based on this, a string is replaced by hierarchical and integrally encoding feature keys, a feature is identified by (pkey, skey, value). In encoding, an encoding interval may be assigned to pkey, where skey corresponds to pkey, a feature interval of each interval is assigned encoding from 0, and there is no need to uniformly perform assignment. Based on experiment, compared with plaintext feature storage, hierarchical and integrally encoding feature keys in this embodiment of this application is optimized by more than 70%.

For multi-period caching: samples of a plurality of historical periods are required for modeling in most application scenarios, to construct sufficient training data, to enable the algorithm to learn more, thereby improving robustness. For example, for a daily update model, samples of more than 3 months (90 periods) are required. In addition to training algorithms every day, a stitching link may take several days. Two cases are considered: 1) Routine algorithm: features do not change, and stitching, training, and prediction are routinely performed every day. 2) Features are gradually added during model iteration.

For the first case, a manner of stitching historical feature plaintext cache is adopted in this embodiment of this application, which significantly improves the efficiency. As shown in FIG. 10, FIG. 10 is a schematic flowchart of stitching historical features according to an embodiment of this application. New period features are incrementally stitched, historical period features are stitched with the new period features by using stitched cache data, and then unified encoding is performed, to generate a feature format for algorithm training. The performance is significantly improved in such a manner. A result of stitching the historical periods with the features (stitching cache features) is cached in plaintext pairs, and the new periods are directly loaded and cached without performing calculation for each period.

For the newly added features mentioned in the second case, generally, model iteration features are gradually added, for example, 300 features have been selected as a baseline, the selected features usually need to be gradually analyzed during iteration optimization and then added to the model, where stitched features historically cached does not have such newly added features. Based on this, cache data of the historical periods is reused. For the newly added features, only stitching of the newly added features is calculated in each period, the features are merged with cached stitching, and then landing for caching again. Compared with full re-stitching, such a method also improves the performance by several times.

For optimization of encoding performance of stitched features: in the last link of feature stitching, stitched feature keys needs to be converted into a format of algorithm training. A statistical method can be adopted, that is, statistics on full feature keys (for example, reading interest→class features such as entertainment, sports, gossip, a discrete feature such as an age period, a continuous feature such as a number of times of consumption) are first collected, and globally unique index is assigned for each feature key.

However, full statistical encoding operation is very time-consuming, that is, sample features of all historical periods needs to be merged, and then a feature key of each sample is expanded. Based on this, an aggregate statistical operation is performed by a fast universal computing engine (such as spark) designed for large-scale data processing through a groupByKey operator. A scenario with a larger data volume includes hundreds of millions of samples, an average of hundreds of feature keys per sample, expanded feature keys reaches 100 million, which may also involve problems such as uneven distribution of feature keys, data skew, and the like.

Based on this, in this embodiment of this application, statistical encoding is replaced in a hash manner. Considering that a hash function is also a mapping relationship in essence, a full encoding time of complexity of O(n) can be optimized to O(1). For a feature index encoding task, in this embodiment of this application, a hash function with a uniform distribution and a low conflict rate is used to generate such a mapping relationship, to improve computation performance of encoding in essence, and ensure the low conflict rate. The feature includes class features and continuous features, where a discrete expression of the class features is {feature dimension, class ID, feature value}, for example, {reading interest, entertainment, 0.3}; and a continuous expression of the continuous features is {dimension, feature value}, for example, {ctr, 0.1}. To adapt the expression structure of the class features and the continuous features, in this embodiment of this application, the features are expressed as [primary key, secondary key, feature value] (i.e., [pkey, skey, value]), each feature is expressed by a 2-level index, for example, the foregoing class feature {reading interest, entertainment, 0.3} may be expressed as [(pkey, reading interest), (skey, entertainment), (value: 0.3)], and the continuous feature may be expressed as [(pkey, ctr), (skey, *), (value: 0.3)].

As shown in FIG. 9, FIG. 9 is a schematic flowchart of 2-level index according to an embodiment of this application. Pkey encoding is performed on "Gender" to obtain 121, and skey encoding is performed on "Male" to obtain 234, thereby obtaining an index encoded value of an original feature "Gender is male" to be "234121". Therefore, during encoding, pkey and skey may be encoded in a hierarchical manner, which greatly reduces the conflict rate. On the basis that pkey is ensured not to be in a conflict, skey may have a certain conflict rate. Skey often belongs to a class of features that causes a slighter impact.

In this embodiment of this application, feature data in actual services are used for testing. A mapping interval of the primary key is 5 to 10 times a number of dimensions of the primary key, and a mapping interval of the secondary key is 2 to 5 times a maximum number of secondary keys, do that a low conflict rate can be ensured. The solution of optimizing encoding performance of stitched features provided in this embodiment of this application has very high efficiency (computation transformation), so that it may be excluded that such a stage becomes a system bottleneck (capable of processing a hundred-dimensional feature), and it is easy to maintain (where there is no need to map data by using a Key-ID, to avoid data unloading, status management and other work especially during online services).

Based on the above, high-performance stitching method provided in this embodiment of this application can resolve the problem of performance of stitching between large-scale samples and features. Through multi-level caching, incremental stitching effectively reuses public modules, which avoids that each algorithm needs to join samples with all feature tables; aggregated features effectively compresses storage through feature key encoding, which reduces loading overheads of a subsequent computation link of the aggregated features; and a hashing operation is performed on stitched features to generate an index, which avoids that full aggregate calculation consumes much time, the performance is improved by more than five times as a whole, and greatly reduces the computation resources of multi-algorithm experiments during stitching.

The method for constructing a recommendation model provided in this embodiment of this application has been described with reference to an exemplary application and implementation of the server provided in this embodiment of this application. An embodiment of this application further provides an apparatus for constructing a recommendation model. During actual application, functional modules in the apparatus for constructing a recommendation model may be cooperatively implemented by hardware resources of an electronic device (such as a terminal device, a server, or a server cluster), for example, a calculation resource such as a processor, and a communication resource (for example, being used for supporting implementation of various types of communication such as optical cable communication and cellular communication), and a memory. FIG. 2 shows the apparatus 555 for constructing a recommendation model stored in the memory 550, which may be software in the form of a program and a plug-in, for example, a software module designed in a programming language such as software C/C++, Java, and the like, application software designed in a programming language such as C/C++, Java, and the like, or a specialized software module in a large software system, an application program interface, a plug-in, a cloud service, and the like. Various implementations are illustrated below.

Example 1: The Apparatus for Constructing a Recommendation Model is a Mobile Application and a Module The apparatus 555 for constructing a recommendation model provided in this embodiment of this application may be provided as a software module designed in a programming language such as software C/C++, Java, and the like, to be embedded in various mobile applications based on a system such as Android or iOS (which is stored in a storage medium of the mobile terminal with executable instructions and executed by a processor of the mobile terminal), thereby directly using computation resources of the mobile terminal to complete the tasks of constructing a recommendation model, and regularly or irregularly transmitting a processing result to a remote server in various network communication manners, or being saved locally on the mobile terminal.

Example 2: The Apparatus for Constructing a Recommendation Model is a Server Application and a Platform The apparatus 555 for constructing a recommendation model provided in this embodiment of this application may be provided as application software designed in a programming language such as C/C++, Java, or a dedicated software module in a large software system, to run on a server side (which is stored in a server-side storage medium in the form of executable instructions, and run by a server-side processor), so that the server uses computation resources of the server to complete relevant information recommendation tasks.

An embodiment of this application may further provide a distributed and paralleled calculation platform constituted by multiple servers, and be attached a customized and easily interactive Web interface or various other user interface (UI) interfaces, to form an information recommendation platform for a person, a group, or an enterprise to use.

Example 3: The Apparatus for Constructing a Recommendation Model is a Server-Side Application Program Interface (API) and a Plug-In The apparatus 555 for constructing a recommendation model provided in this embodiment of this application may be provided as a server-side API or a plug-in for a user to call to perform the method for constructing a recommendation model provided in this embodiment of this application and embedded in various applications.

Example 4. The Apparatus for Constructing a Recommendation Model is a Mobile Device Client API and a Plug-In The apparatus 555 for constructing a recommendation model provided in this embodiment of this application may be provided as a mobile device API or a plug-in for a user to call to perform the method for constructing a recommendation model provided in this embodiment of this application.

Example 5: The Apparatus for Constructing a Recommendation Model is a Cloud Open Service The apparatus 555 for constructing a recommendation model provided in this embodiment of this application may provide a cloud service that is constructed by a recommendation model and developed to a user for obtaining a recommendation list by a person, a group, or an enterprise.

The apparatus 555 for constructing a recommendation model includes a series of modules, including a first aggregation module 5551, a first stitching module 5552, and a first training module 5553. The following continue to describe the solution of recommendation model construction that is cooperatively implemented modules in the apparatus 555 for constructing a recommendation model provided in this embodiment of this application.

a first aggregation module 5551, configured to aggregate a plurality of feature tables corresponding to each application scenario in a recommendation project, and transmit an obtained aggregated feature table to a cache space, the recommendation project including a plurality of application scenarios in a one-to-one correspondence with a plurality of recommendation indicators of a to-be-recommended item, a recommendation model of each application scenario being configured to predict a corresponding recommendation indicator; a first stitching module 5552, configured to read a corresponding user feature and item feature from the aggregated feature table in the cache space based on a user identifier and an item identifier included in a sample data table, and stitch the features with the sample data table, to form a training sample set; and a first training module 5553, configured to train the recommendation model of the application scenario based on the training sample set, the trained recommendation model being capable of fitting a user feature and an item feature in the training sample set.

In some embodiments, the first aggregation module 5551 is further configured to perform the following processing on each application scenario in the recommendation project: aggregating and deduplicating at least a part of features of the plurality of feature tables corresponding to the application scenario, to obtain an aggregated feature table of the application scenario; and combining feature identifiers in the aggregated feature table, to obtain a feature metadata table of the application scenario.

In some embodiments, the first aggregation module 5551 is further configured to aggregate all features of the plurality of feature tables corresponding to the application scenario.

In some embodiments, the first aggregation module 5551 is further configured to determine, from the plurality of feature tables corresponding to each application scenario in the recommendation project, features publicly used by a plurality of training algorithms for training the recommendation model of the application scenario; and aggregate the publicly used features, to obtain the aggregated feature table of the application scenario.

In some embodiments, the first stitching module 5552 is further configured to read a corresponding user feature or item feature from the plurality of feature tables corresponding to the application scenario when the corresponding user feature or item feature is not read from the aggregated feature table in the cache space, and stitch the feature with the sample data table, to form a training sample set.

In some embodiments, when there is a newly added feature table in the application scenario, the first aggregation module 5551 is further configured to stitch the newly added feature table with the aggregated feature table of the application scenario, to obtain a new aggregated feature table; and incrementally update the cache space based on the new aggregated feature table.

In some embodiments, the first aggregation module 5551 is further configured to aggregate newly added feature tables corresponding to new periods when each new period of each application scenario arrives, to obtain an aggregated feature table of the new period; and stitch aggregated feature tables of the new periods, to obtain the aggregated feature table of the application scenario.

In some embodiments, first aggregation module 5551 is further configured to incrementally update the cache space based on the aggregated feature table of the new period; and read an aggregated feature table of a historical period corresponding to the new period from the cache space as the aggregated feature table of the new period, the historical period corresponding to the new period being a period before the new period.

In some embodiments, the first stitching module 5552 is further configured to perform the following processing when each new period of each application scenario arrives: reading a corresponding user feature and item feature from an aggregated feature table of the new period in the cache space based on a user identifier and an item identifier included in a sample data table of the new period; and stitching the user feature and the item feature with the sample data table of the new period, to obtain cache features of the new period.

In some embodiments, the first stitching module 5552 is further configured to incrementally update the cache space based on the cache feature of the new period; and read a plurality of cache features of a historical period corresponding to the new period from the cache space; and stitch the plurality of cache features of the historical period with the cache feature of the new period, to obtain the training sample set of the application scenario, the historical period being a period before the new period.

In some embodiments, the first aggregation module 5551 is further configured to map feature identifiers in the obtained aggregated feature table, to obtain integer values of the feature identifiers; update the feature identifiers in the aggregated feature table to the integer values, to obtain a compressed aggregated feature table; and transmit the compressed aggregated feature table to the cache space.

In some embodiments, the first training module 5553 is further configured to perform primary key encoding on a feature identifier of each training sample of the training sample set, to obtain a primary key encoded value of the feature identifier; perform secondary key encoding on the feature identifier of each training sample, to obtain a secondary key encoded value of the feature identifier; stitch the primary key encoded value and the secondary key encoded value, to obtain an index encoded value of the feature identifier; and update the feature identifier of the training sample to the index encoded value, to obtain an updated training sample and train the recommendation model of the application scenario based on the updated training sample.

The apparatus for constructing a neural network model includes a series of modules, including a second aggregation module, a second stitching module, and a second training module. The following continue to describe the solution of neural network model construction that is cooperatively implemented modules in the apparatus for constructing a neural network model provided in this embodiment of this application.

a second aggregation module, configured to aggregate a plurality of feature tables corresponding to each application scenario in an application project, and transmit an obtained aggregated feature table to a cache space, the application project including a plurality of application scenarios in a one-to-one correspondence with a plurality of application indicators, a neural network model of each application scenario being configured to predict a corresponding application indicator; a second stitching module, configured to read corresponding features from the aggregated feature table in the cache space based on feature identifiers included in a sample data table, and stitch the features with the sample data table, to form a training sample set; and a second training module, configured to train the neural network model of the application scenario based on the training sample set, the trained neural network model being capable of fitting features in the training sample set.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing method for constructing a recommendation model or the method for constructing a neural network model provided in the embodiments of this application.

An embodiment of this application provides a computer-readable storage medium storing executable instructions, the executable instructions, when executed by a processor, causing the processor to perform the method for constructing a recommendation model or the method for constructing a neural network model provided in the embodiments of this application, for example, the method for constructing a neural network model shown in FIG. 3 and FIG. 4, or the method for constructing a recommendation model shown in FIG. 6.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for constructing a recommendation model performed by an electronic device, the method comprising:

aggregating a plurality of feature tables corresponding to each application scenario in a recommendation project to obtain an aggregated feature table, the recommendation project comprising a plurality of application scenarios in a one-to-one correspondence with a plurality of recommendation indicators of an information item and each application scenario having a recommendation model being configured to predict a corresponding recommendation indicator;

receiving a corresponding user feature and item feature from the aggregated feature table based on a user identifier and an item identifier comprised in a sample data table, and stitching the user feature and the item feature with the sample data table, to form a training sample set;

performing primary key encoding on a feature identifier of each training sample of the training sample set, to obtain a primary key encoded value of the feature identifier;

performing secondary key encoding on the feature identifier of each training sample, to obtain a secondary key encoded value of the feature identifier;

stitching the primary key encoded value and the secondary key encoded value, to obtain an index encoded value of the feature identifier;

updating the feature identifier of the training sample to the index encoded value, to obtain an updated training sample set;

training the recommendation model of the application scenario based on the updated training sample set, the trained recommendation model being capable of fitting a user feature and an item feature in the updated training sample set; and recommending information items to at least one user using the trained recommendation model.

2. The method according to claim 1, wherein the aggregating a plurality of feature tables corresponding to each application scenario in a recommendation project to obtain an aggregated feature table comprises:

aggregating and deduplicating at least a part of features of the plurality of feature tables corresponding to the application scenario, to obtain an aggregated feature table of the application scenario; and combining feature identifiers in the aggregated feature table, to obtain a feature metadata table of the application scenario.

3. The method according to claim 2, wherein the aggregating at least a part of features of the plurality of feature tables corresponding to the application scenario comprises:

aggregating all features of the plurality of feature tables corresponding to the application scenario.

4. The method according to claim 2, wherein the aggregating at least a part of features of the plurality of feature tables corresponding to the application scenario comprises:

determining, from the plurality of feature tables corresponding to each application scenario in the recommendation project, features publicly used by a plurality of training algorithms for training the recommendation model of the application scenario; and aggregating the publicly used features, to obtain the aggregated feature table of the application scenario.

5. The method according to claim 1, wherein when a newly added feature table exists in the application scenario, the method further comprises:

stitching the newly added feature table with the aggregated feature table of the application scenario, to obtain a new aggregated feature table; and incrementally updating a cache space based on the new aggregated feature table.

6. The method according to claim 1, wherein the aggregating a plurality of feature tables corresponding to each application scenario in a recommendation project comprises:

aggregating newly added feature tables corresponding to new periods when each new period of each application scenario arrives, to obtain an aggregated feature table of the new period; and stitching aggregated feature tables of the new periods, to obtain the aggregated feature table of the application scenario.

7. The method according to claim 1, wherein the receiving a corresponding user feature and item feature from the aggregated feature table based on a user identifier and an item identifier comprised in a sample data table, and stitching the user feature and the item feature with the sample data table comprises:

when each new period of each application scenario arrives:

reading a corresponding user feature and item feature from an aggregated feature table of the new period in a cache space based on a user identifier and an item identifier comprised in a sample data table of the new period; and stitching the user feature and the item feature with the sample data table of the new period, to obtain cache features of the new period.

8. The method according to claim 1, further comprising:

mapping feature identifiers in the obtained aggregated feature table, to obtain integer values of the feature identifiers;

updating the feature identifiers in the aggregated feature table to the integer values, to obtain a compressed aggregated feature table; and transmitting the compressed aggregated feature table to a cache space.

9. An electronic device, comprising:

a memory, configured to store executable instructions; and a processor, configured to perform, when executing the executable instructions stored in the memory, a method for constructing a recommendation model, the method including:

aggregating a plurality of feature tables corresponding to each application scenario in a recommendation project to obtain an aggregated feature table, the recommendation project comprising a plurality of application scenarios in a one-to-one correspondence with a plurality of recommendation indicators of an information item and each application scenario having a recommendation model being configured to predict a corresponding recommendation indicator;

receiving a corresponding user feature and item feature from the aggregated feature table based on a user identifier and an item identifier comprised in a sample data table, and stitching the user feature and the item feature with the sample data table, to form a training sample set;

performing primary key encoding on a feature identifier of each training sample of the training sample set, to obtain a primary key encoded value of the feature identifier;

performing secondary key encoding on the feature identifier of each training sample, to obtain a secondary key encoded value of the feature identifier;

stitching the primary key encoded value and the secondary key encoded value, to obtain an index encoded value of the feature identifier;

updating the feature identifier of the training sample to the index encoded value, to obtain an updated training sample set;

training the recommendation model of the application scenario based on the updated training sample set, the trained recommendation model being capable of fitting a user feature and an item feature in the updated training sample set; and recommending information items to at least one user using the trained recommendation model.

10. The electronic device according to claim 9, wherein the aggregating a plurality of feature tables corresponding to each application scenario in a recommendation project to obtain an aggregated feature table comprises:

aggregating and deduplicating at least a part of features of the plurality of feature tables corresponding to the application scenario, to obtain an aggregated feature table of the application scenario; and combining feature identifiers in the aggregated feature table, to obtain a feature metadata table of the application scenario.

11. The electronic device according to claim 9, wherein when a newly added feature table exists in the application scenario, the method further comprises:

stitching the newly added feature table with the aggregated feature table of the application scenario, to obtain a new aggregated feature table; and incrementally updating a cache space based on the new aggregated feature table.

12. The electronic device according to claim 9, wherein the aggregating a plurality of feature tables corresponding to each application scenario in a recommendation project comprises:

aggregating newly added feature tables corresponding to new periods when each new period of each application scenario arrives, to obtain an aggregated feature table of the new period; and stitching aggregated feature tables of the new periods, to obtain the aggregated feature table of the application scenario.

13. The electronic device according to claim 9, wherein the receiving a corresponding user feature and item feature from the aggregated feature table based on a user identifier and an item identifier comprised in a sample data table, stitching the user feature and the item feature with the sample data table comprises:

when each new period of each application scenario arrives:

reading a corresponding user feature and item feature from an aggregated feature table of the new period in a cache space based on a user identifier and an item identifier comprised in a sample data table of the new period; and stitching the user feature and the item feature with the sample data table of the new period, to obtain cache features of the new period.

14. The electronic device according to claim 9, wherein the method further comprises:

mapping feature identifiers in the obtained aggregated feature table, to obtain integer values of the feature identifiers;

updating the feature identifiers in the aggregated feature table to the integer values, to obtain a compressed aggregated feature table; and transmitting the compressed aggregated feature table to a cache space.

15. A non-transitory computer-readable storage medium, storing executable instructions that, when executed by a processor of a computer device, implements a method for constructing a recommendation model, the method including:

aggregating a plurality of feature tables corresponding to each application scenario in a recommendation project to obtain an aggregated feature table, the recommendation project comprising a plurality of application scenarios in a one-to-one correspondence with a plurality of recommendation indicators of an information item and each application scenario having a recommendation model being configured to predict a corresponding recommendation indicator;

receiving a corresponding user feature and item feature from the aggregated feature table based on a user identifier and an item identifier comprised in a sample data table, and stitching the user feature and the item feature with the sample data table, to form a training sample set;

performing primary key encoding on a feature identifier of each training sample of the training sample set, to obtain a primary key encoded value of the feature identifier;

performing secondary key encoding on the feature identifier of each training sample, to obtain a secondary key encoded value of the feature identifier;

stitching the primary key encoded value and the secondary key encoded value, to obtain an index encoded value of the feature identifier;

updating the feature identifier of the training sample to the index encoded value, to obtain an updated training sample set;

training the recommendation model of the application scenario based on the updated training sample set, the trained recommendation model being capable of fitting a user feature and an item feature in the updated training sample set; and recommending information items to at least one user using the trained recommendation model.

16. The non-transitory computer-readable storage medium according to claim 15, wherein the aggregating a plurality of feature tables corresponding to each application scenario in a recommendation project to obtain an aggregated feature table comprises:

aggregating and deduplicating at least a part of features of the plurality of feature tables corresponding to the application scenario, to obtain an aggregated feature table of the application scenario; and combining feature identifiers in the aggregated feature table, to obtain a feature metadata table of the application scenario.

17. The non-transitory computer-readable storage medium according to claim 15, wherein when a newly added feature table exists in the application scenario, the method further comprises:

stitching the newly added feature table with the aggregated feature table of the application scenario, to obtain a new aggregated feature table; and incrementally updating a cache space based on the new aggregated feature table.

18. The non-transitory computer-readable storage medium according to claim 15, wherein the aggregating a plurality of feature tables corresponding to each application scenario in a recommendation project comprises:

aggregating newly added feature tables corresponding to new periods when each new period of each application scenario arrives, to obtain an aggregated feature table of the new period; and stitching aggregated feature tables of the new periods, to obtain the aggregated feature table of the application scenario.

* * * * *